United States Patent [19]
Jung

[11] Patent Number: 5,889,382
[45] Date of Patent: Mar. 30, 1999

[54] CHARGING DEVICE FOR COMMONLY CHARGING VARIOUS KINDS OF BATTERY

[75] Inventor: Yeon-Tak Jung, Kyungki-do, Rep. of Korea

[73] Assignee: Samsung Electronics Co., Ltd., Suwon, Rep. of Korea

[21] Appl. No.: 889,039

[22] Filed: Jul. 7, 1997

[30] Foreign Application Priority Data

Jul. 6, 1996 [KR] Rep. of Korea .................. 1996 27382

[51] Int. Cl.$^6$ ...................................... H02J 7/00
[52] U.S. Cl. ........................................... 320/106; 320/162
[58] Field of Search ................................... 320/106, 162, 320/134

[56] References Cited

U.S. PATENT DOCUMENTS 4,965,738  10/1990  Bauer et al. ............................. 364/483
5,200,686  4/1993  Lee .......................................... 320/112

Primary Examiner—Peter S. Wong
Assistant Examiner—Gregory J Toatley, Jr.
Attorney, Agent, or Firm—Dilworth & Barrese

[57] ABSTRACT

A charging device for commonly charging various kinds of batteries is provided. The charging device includes a switching portion controlled to interrupt the supply of power to the charging device and a plurality of charging paths located between a charging power supply port and the battery's charging port, corresponding to the kinds of battery. A charging voltage detector detects a predetermined voltage or current formed when connected to the first sensing resistor of a battery assembly in order to detect the charged voltage of the battery and a capacity detector detects a predetermined voltage or current formed when connected to the second sensing resistor of the battery assembly in order to detect the charged capacity of the battery. A main controller determines the kind of battery and selects a corresponding charging path according to the voltage and current value respectively detected from the charging voltage detector and capacity detector so as to allow the selected charging path to be connected to the battery's charging port.

6 Claims, 4 Drawing Sheets

CHARGING DEVICE FOR COMMONLY CHARGING VARIOUS KINDS OF BATTERY

BACKGROUND OF THE INVENTION

1. Field of the Invention

The present invention relates to a charging circuit and, more particularly, to a charging device for charging various kinds of batteries having different charging voltages and capacities.

2. Description of the Related Art

With the development of battery technology, various charging batteries, such as first cell, secondary cell, fuel cell, and physical cell, are being produced. As many kinds of batteries of user demanded capacities become popular, they are widely used in the form a cell or pack in electronic appliances. However, even for the same family of batteries, their charging voltages vary. For instance, the lithium-ion battery, widely used in communications apparatuses, has roughly three kinds with different charging voltages. The graphite series and non-graphitizable carbon series have the maximum 8.4V of charging voltage, the coke series having 8.2V. Even the same lithium-ion battery has different charging voltages in accordance with internal density and internal material components. Since the charging voltage and capacity varies with batteries, different charging devices are needed.

As mentioned above, charging devices are required for the respective charging voltages and capacities, and this makes the user's selection range narrow. In other words, what one kind of charging device can charge is limited to only one battery of a fixed capacity determined in the design of the charging device.

SUMMARY OF THE INVENTION

It is therefore an object of the present invention to provide a charging device for commonly charging batteries of different charging voltages and capacities.

To accomplish this object, there is provided a charging device for commonly charging various kinds of batteries. The device charges them when connected to a battery assembly having a charging battery and first and second sensing resistors coupled to the battery. The charging device of the invention includes a switching portion controlled to interrupt the supply of power to the charging device and a plurality of charging paths located between a charging power supply port and the battery's charging port, corresponding to the kinds of battery. A charging voltage detector detects a predetermined voltage or current formed when connected to the first sensing resistor of the battery assembly in order to detect the charged voltage of the battery and a capacity detector detects a predetermined voltage or current formed when connected to the second sensing resistor of the battery assembly in order to detect the charged capacity of the battery. A controller determines the kind of battery and selects a corresponding charging path according to the voltage and current value respectively detected from the charging voltage detector and capacity detector so as to allow the selected charging path to be connected to the battery's charging port.

BRIEF DESCRIPTION OF THE DRAWINGS

The invention will be more fully understood and further advantages will become more apparent when reference is made to the following detailed description of the preferred embodiments of the invention and the accompanying drawings in which.

DETAILED DESCRIPTION OF THE PREFERRED EMBODIMENT

Figure 1:
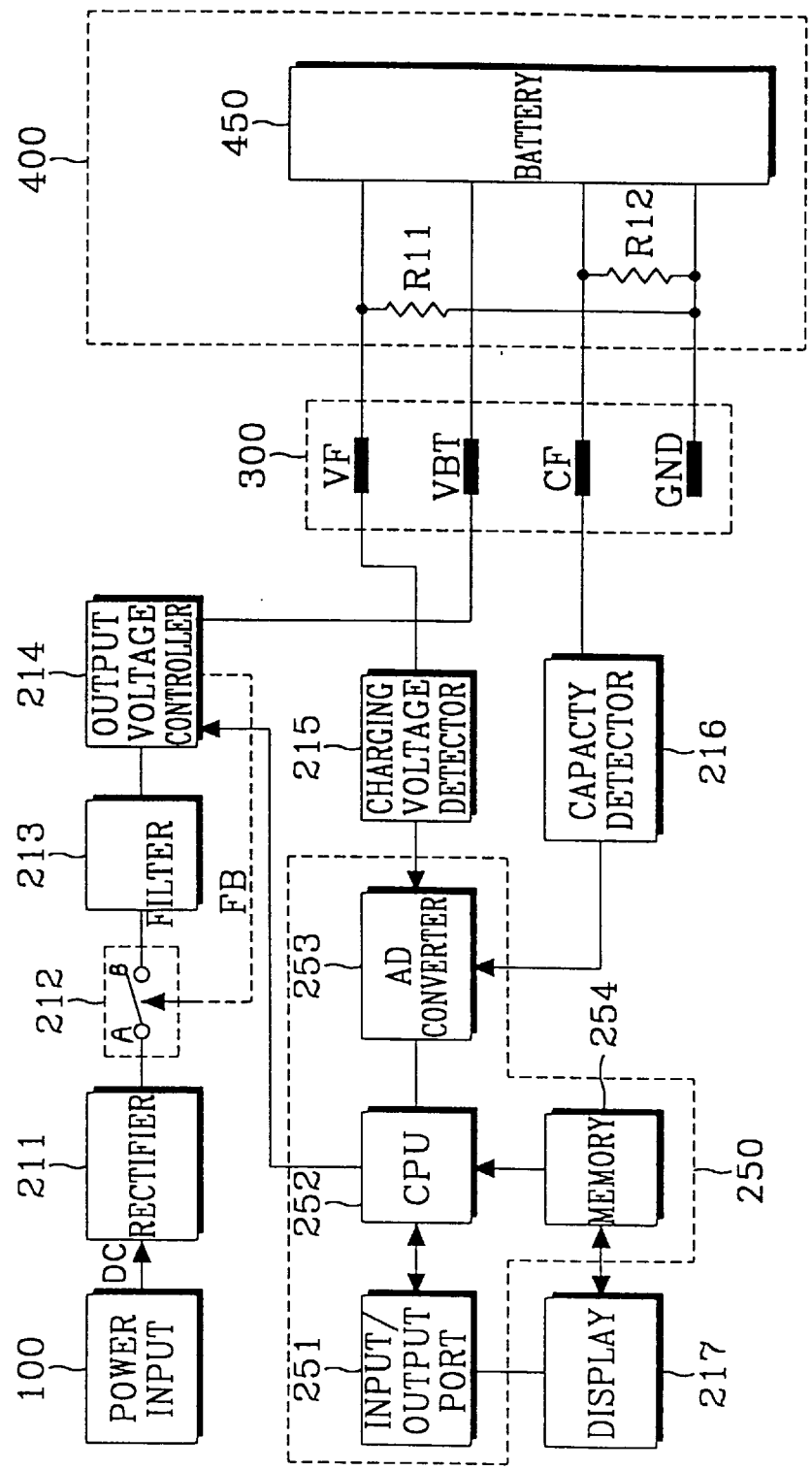
FIG. 1 is a block diagram of one embodiment of a charging device for commonly charging various kinds of batteries according to the present invention.

Referring to FIG. 1, a battery assembly 400 including a charging battery 450 and two sensing resistors R11 and R12 are connected to the charging device of the present invention. Connector 300 comprises a voltage feedback port VF, charging port VBT, current feedback port CF, and ground port GND, in order to connect the charging device to the battery assembly 400. When the battery assembly 400 is coupled to the charging device, voltage feedback port VF and current feedback port CF are connected to sensing resistors R11 and R12, respectively. The other ports of resistors R11 and R12 are grounded.

According to the construction of the charging device, power input portion 100 converts alternate current input via an AC plug into direct current. Rectifier 211 receives direct current from power input portion 100, and detects a predetermined current. Filter 213 removes the noise of the current detected from rectifier 211. Switching portion 212 connects or disconnects between rectifier 211 and filter 213 in response to a predetermined control signal. Output voltage controller 214 connected to charging port VBT checks whether the voltage charged to battery 450 is higher or lower than a predetermined charging voltage of corresponding battery 450. If higher, a predetermined feedback signal FB is generated to switching portion 212 in order to disconnect rectifier 211 and filter 213. Charging voltage detector 215 detects a predetermined voltage or current formed when connected to sensing resistor R11 via voltage feedback port VF of connector 300. By utilizing the voltage or current detected from charging voltage detector 215, a determination as to the kind of battery 450 is made because the value of sensing resistor R11 varies depending on the kind of battery 450.

Capacity detector 216 detects a predetermined voltage or current formed when connected to sensing resistor R12 via current feedback port CF of connector 300. Again, by utilizing the voltage or current detected from capacity detector 216, a determination as to the kind of battery 450 cam be made because the value of sensing resistor R12 varies depending on the kind of battery 450. The following table shows examples of values of sensing resistor R12 in accordance with the charging capacity of battery 450.

| Charging capacity(mA) | R12(KΩ) |
| --- | --- |
| 400 | 4.7 |
| 830 | 2.4 |
| 1,300 | 1.1 |

Main controller 250, made up with input/output port 251, CPU 252, analog-to-digital converter 253, and memory 254, controls the overall operations related to the insertion, capacity, charging current and safety of battery 450.

Memory 254 stores a predetermined voltage and capacity reference value. Analog-to-digital converter 253 digitizes analog voltage and current detected from charging voltage detector 215 and capacity detector 216, and sends them to CPU 252. Display 217 is designed to indicate predetermined states according to control signals and data transmitted from CPU 252 via input/output port 251. In this embodiment, a light-emitting diode (LED) is used as display 217 to visually confirm, with the naked eyes, the state of charging whether or not charging is being performed.

Figure 2:
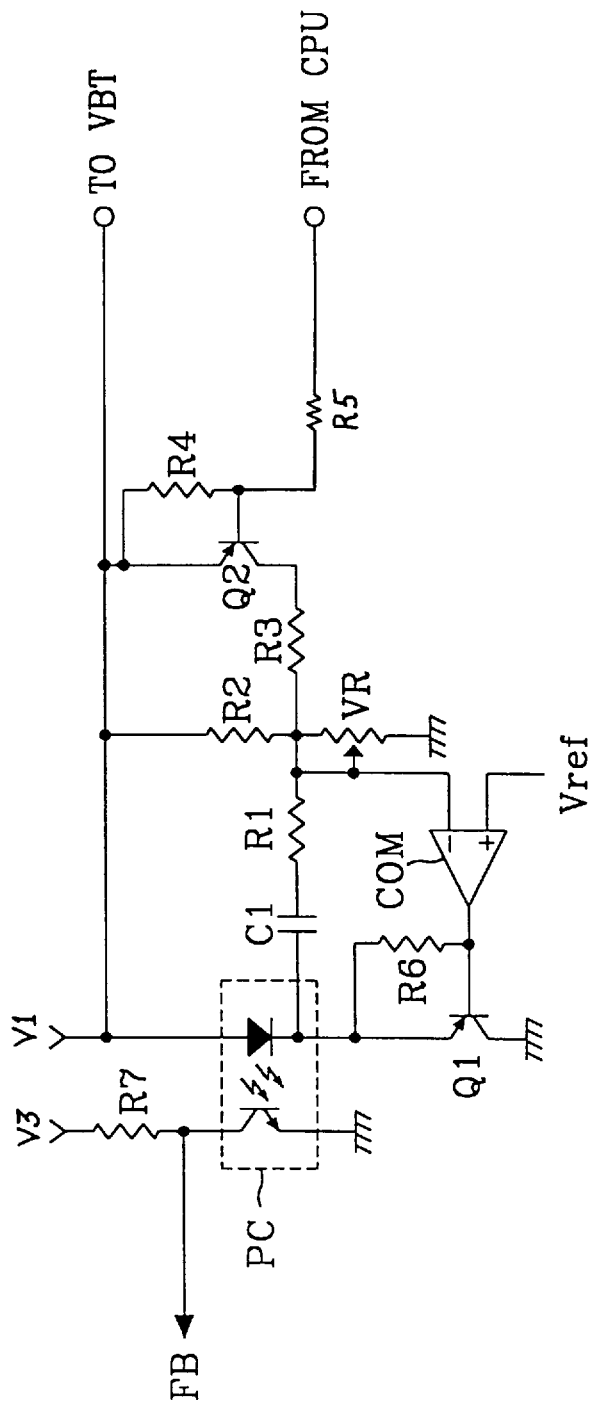
FIG. 2 is a detailed circuit diagram of the output voltage controller shown in FIG. 1.

Referring to FIG. 2, this embodiment of the present invention uses two kinds of battery and assumes that their respective charging voltages are 8.2V and 8.4V.

At the non-inverting port of comparator COM forming output voltage controller 214, the reference voltage Vref is set to 8.2V, and at the inverting port, variable resistor VR with other resistors R1, R2 and R3 is properly controlled so that the output of comparator COM is maintained in a high state until charging voltage V1 becomes 8.2V. If charging voltage V1 is higher than 8.2V, comparator COM generates a low state of output signal. Therefore, transistor Q1 is turned ON so that a current path connecting the emitter and collector of transistor Q1 is formed at the LED of photocoupler PC. With this, the light receiving transistor of photocoupler PC runs to generate feedback signal FB in a low state so that ports a and b of switching portion 212 are open. Output voltage controller 214 selectively drives two charging paths so as to selectively charge 8.2V and 8.4V according to the battery type deciding signal provided by CPU 252. Assuming that 8.4V is charged if the battery type deciding signal fed from CPU 252 is in LOW state, transistor Q2 is rendered OFF when the battery type deciding signal is in HIGH state. Resistor R3 is connected in parallel to resistor R2, the voltage corresponding to the resistance being 8.4V.

Figure 3:
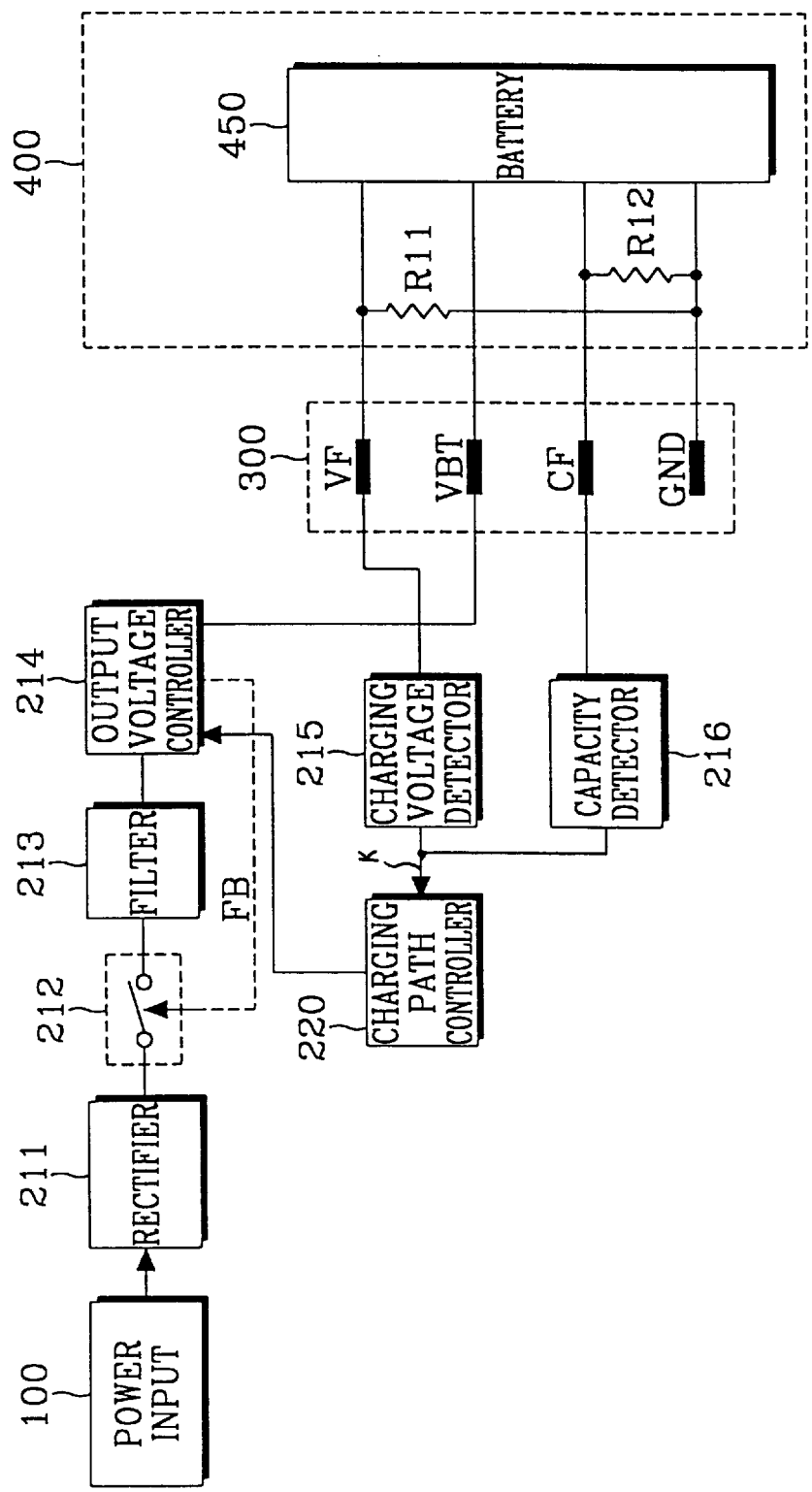
FIG. 3 is a block diagram of another embodiment of the charging device for commonly charging various kinds of batteries according to the present invention.
Figure 4:
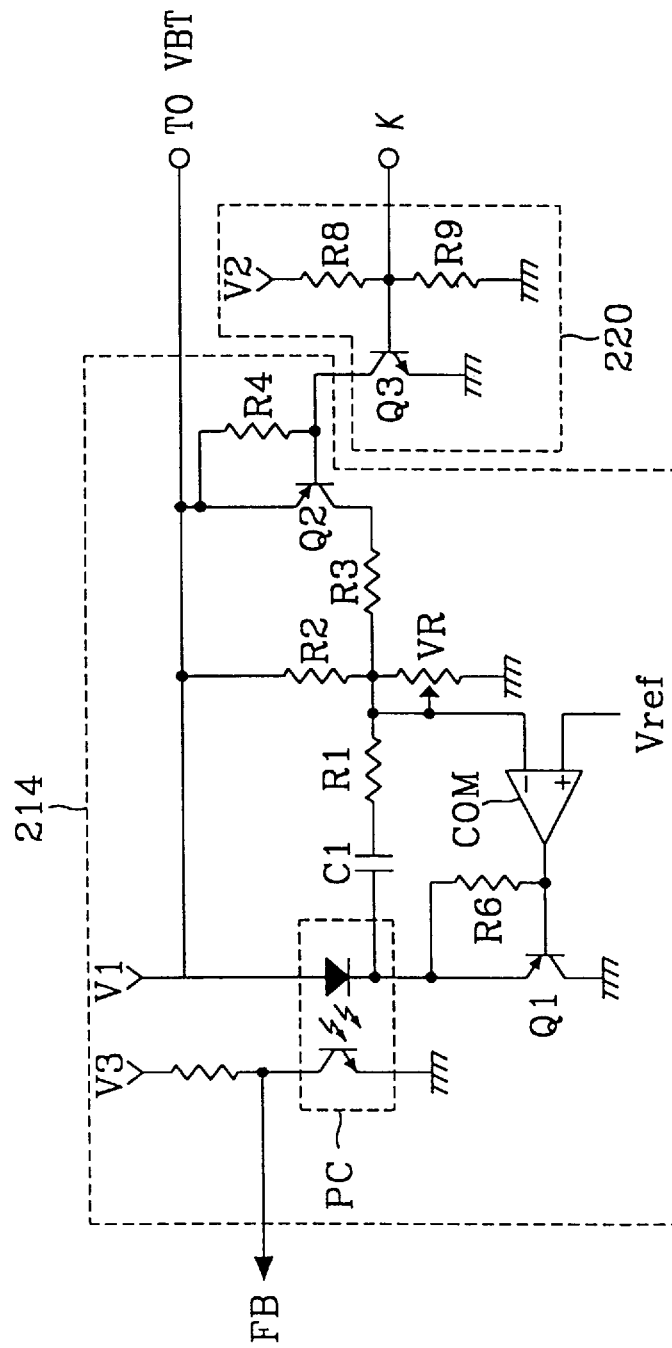
FIG. 4 is a detailed circuit diagram of the output voltage controller and charging path controller shown in FIG. 3.

Referring to FIG. 3, this embodiment is different from that of FIG. 1 in that control is performed by a charging path controller 220 not by CPU 252. FIG. 4 shows a detailed circuit diagram of output voltage controller 214 and charging path controller 220 of FIG. 3. The basic operations of output voltage controller 214 are almost the same as those in the description of FIG. 2. The only difference is that transistor Q2 is ON or OFF when transistor Q3 becomes ON or OFF by applying the voltage (K) detected from charging voltage detector 215 and capacity detector 216 to the base of transistor Q3. When battery assembly 400 in which the charging voltage is 8.4V is connected to connector 300, the voltage (K) formed by the resistor component of charging voltage detector 215 and capacity detector 216, and resistors R11 and R12 is supplied to the base of transistor Q3. Then, when transistor Q3 is turned OFF, resistor R3 becomes parallel with resistor R2 with the voltage corresponding to the resistance value being 8.4V.

As described above, the charging device of the present invention enables various kinds of batteries of different charging voltages and capacities to be commonly charged, dispensing with various charging devices for respective batteries of different charging voltages and capacities. For users, this reduces the cost and brings convenience, widening the range of selection.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A charging device for charging different kinds of batteries by electrically connecting to a battery assembly having a charging battery with charging ports and first and second sensing resistors coupled to the battery, the charging device comprising:

a switching portion controlled to interrupt the supply of power to the charging device;

a plurality of charging paths located between a charging power supply port and the battery's charging port;

a charging voltage detector for detecting a predetermined voltage or current formed when connected to the first sensing resistor of the battery assembly in order to detect the charged voltage of the battery;

a capacity detector for detecting a predetermined voltage or current formed when connected to the second sensing resistor of the battery assembly in order to detect the charged capacity of the battery; and a controller for determining the kind of battery and selecting a corresponding charging path according to the voltage and current value respectively detected from said charging voltage detector and capacity detector, said controller connecting the selected charging path to the battery's charging port.

2. The charging device as claimed in claim 1, further comprising an output voltage controller connected to the positive battery charging port for determining whether the voltage currently charged in the battery is higher than a proper charging voltage of a corresponding battery, said output controller generating a predetermined feedback signal to said switching portion when the voltage currently charged in the battery is higher, said feedback signal opening said switching portion.

3. The charging device as claimed in claim 1, further comprising a display connected to said controller and adapted to provide visual indication of predetermined states so that a user can confirm the state of charging.

4. A charging device for commonly charging various kinds of batteries, the device charging them when connected to a battery assembly having a charging battery and first and second sensing resistors coupled to the battery, the charging device comprising:

a connector having a voltage feedback port, a positive charging port, a current feedback port and a ground port, said connector coupling the voltage feedback port and current feedback port to the battery via the first and second sensing resistors, respectively, when the battery assembly is mounted on the charging device;

a switching portion controlled to interrupt the supply of power to the charging device;

a plurality of charging paths located between a charging power supply port and the connector's charging port;

an output voltage controller connected to the positive charging port of said connector, for determining whether the voltage currently charged in the battery is higher than a proper charging voltage of a corresponding battery, and generating a predetermined feedback signal to the switching portion when the voltage currently charged in the battery is higher, said feedback signal opening said switching portion;

a charging voltage detector for detecting a predetermined voltage or current formed when connected to the first sensing resistor of the battery assembly via the voltage feedback port of the connector;

a capacity detector for detecting a predetermined voltage or current formed when connected to the second sensing resistor of the battery assembly via the current feedback port of the connector;

a memory for storing a predetermined charging voltage and capacity reference value according to the kind of the battery;

an analog-to-digital converter for digitalizing analog voltage and current detected from said charging voltage detector and capacity detector; and a CPU for accessing said memory according to the voltage and current value transmitted from said analog-to-digital converter, said CPU deciding the kind of the battery, and generating a battery type deciding signal to select one charging path.

5. The charging device as claimed in claim 4, further comprising a display adapted to provide visual indication of predetermined states so that a user can confirm the state of charging.

6. A charging device for charging different kinds of batteries by electrically connecting to a battery assembly having a charging battery and sensing means coupled to a battery, the charging device comprising:

a plurality of charging paths located between a charging power supply port and the battery's charging port;

detection means connected to the sensing means for detecting the charged voltage and capacity of the battery; and controller means for determining the kind of battery and connecting a selected charging path in response to detected voltage and capacity values.

* * * * *